United States Patent
Purdy et al.

(10) Patent No.: US 12,000,431 B2
(45) Date of Patent: Jun. 4, 2024

(54) MINIMIZED LATERAL CLEARANCE BALL STUD JOINT

(71) Applicant: Acument Intellectual Properties, LLC, Sterling Heights, MI (US)

(72) Inventors: Paul Purdy, Holly, MI (US); Gary Sifferman, Grand Blanc, MI (US)

(73) Assignee: Acument Intellectual Properties, LLC, Sterling Heights, MI (US)

( * ) Notice: Subject to any disclaimer, the term of this patent is extended or adjusted under 35 U.S.C. 154(b) by 181 days.

(21) Appl. No.: 17/587,744

(22) Filed: Jan. 28, 2022

(65) Prior Publication Data

US 2022/0243760 A1  Aug. 4, 2022

Related U.S. Application Data

(60) Provisional application No. 63/143,495, filed on Jan. 29, 2021.

(51) Int. Cl.
F16C 11/06 (2006.01)

(52) U.S. Cl.
CPC ...... *F16C 11/0604* (2013.01); *F16C 11/0685* (2013.01); *F16C 11/0695* (2013.01)

(58) Field of Classification Search
CPC .......... F16B 5/0258; F16B 9/07; F16B 19/02; F16B 35/048; F16C 11/0604; F16C 11/0609; F16C 11/0685; F16C 11/069; F16C 11/0695; Y10T 403/4966
USPC ...................................................... 403/282
See application file for complete search history.

(56) References Cited

U.S. PATENT DOCUMENTS

| | | | |
|---|---|---|---|
| 2,215,967 A | | 9/1940 | Leighton |
| 3,563,564 A | * | 2/1971 | Bartkowiak ........ F16C 11/0604 403/126 |
| 6,478,519 B1 | * | 11/2002 | Genick, II ............ F16B 5/0258 411/353 |
| 6,527,468 B1 | * | 3/2003 | Lindquist ............ F16C 11/0604 403/135 |
| 7,677,853 B2 | * | 3/2010 | Donovan .............. F16B 35/041 411/416 |
| 10,144,259 B2 | * | 12/2018 | North ................... F16C 11/0604 |
| 10,550,876 B2 | * | 2/2020 | Slater .................... F16B 41/002 |

(Continued)

FOREIGN PATENT DOCUMENTS

| | | | | |
|---|---|---|---|---|
| DE | 1953030 U | | 1/1967 | |
| DE | 102013110605 A1 | * | 4/2014 | ............. F16B 19/02 |
| DE | 102013113993 A1 | * | 6/2014 | ............ F16B 5/0258 |

*Primary Examiner* — Josh Skroupa
(74) *Attorney, Agent, or Firm* — Quinn IP Law

(57) ABSTRACT

A ball stud assembly includes a ball stud for engaging a component with a stepped bore extending along a bore axis and a reaction surface orthogonal to the bore axis. The stud includes a ball first end, a threaded second end, and a flange. The stud additionally includes a shank extending along a stud axis between the first and second ends, having a stepped shank shape, and configured to extend through the stepped bore and leave a gap between the bore and the shank. The stud also includes a flange between the first end and the shank with a flange surface orthogonal to the stud axis for engaging and abutting the reaction surface. The stud additionally includes a sleeve positioned on the shank and a threaded nut configured to tighten the stud on the component and deform the sleeve such that the sleeve fills at least part of the gap.

19 Claims, 8 Drawing Sheets

(56) References Cited

U.S. PATENT DOCUMENTS

| | | |
|---|---|---|
| 2002/0163151 A1 | 11/2002 | Timoney et al. |
| 2003/0113157 A1 | 6/2003 | Bodin et al. |
| 2013/0322985 A1* | 12/2013 | Gasmen .................... F16B 5/02 |
| | | 411/367 |
| 2017/0282662 A1 | 10/2017 | North et al. |
| 2019/0376548 A1* | 12/2019 | Matsumoto ........... F16B 5/0258 |

* cited by examiner

MINIMIZED LATERAL CLEARANCE BALL STUD JOINT

CROSS-REFERENCE TO RELATED APPLICATION(S)

This application claims the benefit of U.S. Provisional Application Ser. No. 63/143,495 filed Jan. 29, 2021, the entire content of which is hereby incorporated by reference.

INTRODUCTION

The present disclosure relates to minimized lateral clearance ball stud joint for service in assemblies typically subjected to axial and lateral loads.

Generally, a ball and socket joint (or spheroid joint) is a type of joint in which a ball-shaped surface of one rounded component fits into a cup-like depression of another component. Such a construction enables the two components to move relative to one another around an indefinite number of axes having a common center, i.e., permits the joint to move in many directions.

In an automobile, ball joints are configured as spherical bearings typically connecting suspension control arms to steering knuckles. A ball joint generally includes a bearing stud and socket enclosed in a casing. The bearing stud is typically tapered and threaded, and fits into a tapered hole in the steering knuckle. A protective sheath, such as a rubber boot, protects the joint assembly from contamination, while allowing joint movement and expansion of an internal lubricant. Such ball joints may be retained with an internal spring to help minimize vibration concerns in the linkage.

SUMMARY

A ball stud assembly includes a ball stud for engaging a component having a thickness, defining a stepped bore extending through the thickness, centered on and extending along a bore axis, and having a reaction surface orthogonal to the bore axis. The ball stud also includes a ball first end and a threaded second end. The ball stud additionally includes a shank extending along a stud axis between the first and second ends, having a stepped shank shape, and configured to extend through the stepped bore and leave a gap between the stepped bore and the stepped shank shape. The ball stud also includes a flange arranged between the ball first end and the shank, having a flange surface arranged orthogonal to the stud axis, and configured to engage and abut the reaction surface. The ball stud additionally includes a sleeve having a sleeve center axis and positioned on the shank. Furthermore, the ball stud includes a threaded nut configured to engage the threaded second end to tighten the ball stud on the component and deform the sleeve in the gap between the stepped bore and the stepped shape shank such that the sleeve fills at least part of the gap.

In one embodiment, the stepped bore may have a stepped bore inside diameter (ID). The stepped shank shape may have a stepped shank outside diameter (OD). The stepped shank OD may include a first shank section having a first shank section OD and a second shank section having a second shank section OD. In such an embodiment, the first shank section OD may be larger than the second shank section OD.

The stepped bore ID may include a first bore section having a first bore section ID and a second bore section having a second bore section ID. Additionally, the first bore section ID may be larger than the second bore section OD and the first shank section OD may be larger than the second bore section ID.

The sleeve may have a sleeve OD and a sleeve ID. In such an embodiment, before the sleeve is deformed by tightening of the threaded nut, the sleeve OD may be smaller than the first bore section ID but larger than the second bore section ID, the sleeve ID may be larger than the second shank section OD but smaller than the first shank section OD. Also, the sleeve may be arranged on the second shank OD. Furthermore, in such an embodiment, the gap between the stepped bore and the stepped shank shape may include a space between the first shank section OD and the first bore section ID.

By tightening of the threaded nut, the sleeve may be forced via the second bore section ID toward the first bore section ID. In such an event, the sleeve may deform by shifting, at least in part, from the second shank section OD to the first shank section OD.

In an alternative embodiment, the stepped bore may have a polygonal shaped first bore section and a second bore section. The second bore section may be specifically configured to engage the ball stud threaded second end. The stepped shank shape may have a polygonal shaped first section defined by a first shank section perimeter and a polygonal shaped second section defined by a second shank section perimeter. In such an embodiment, the first shank section perimeter may be larger than the second shank section perimeter.

The sleeve may have a polygonal shape defined by a sleeve inner perimeter. In such an embodiment, before the sleeve is deformed by tightening of the threaded nut, the sleeve inner perimeter may be larger than the second shank section perimeter but smaller than the first shank section perimeter. Also, the gap between the stepped bore and the stepped shank shape may include a space between the first shank section and the polygonal shaped first bore section. Furthermore, in such an embodiment, the sleeve may be positioned on the second shank section perimeter.

By tightening the threaded nut, the sleeve may be forced via the polygonal shaped second bore section toward the polygonal shaped first bore section. In such an event, the sleeve may deform by shifting, at least in part, from the polygonal shaped second section to the polygonal shaped first section.

The sleeve may additionally include an outer surface, an inner surface, and at least one longitudinal groove arranged on either the sleeve inner surface or outer surface and extending parallel to the sleeve center axis. Alternatively, such longitudinal grooves may be arranged on each of the inner and outer surfaces of the sleeve.

A ball joint subassembly using the above disclosed ball stud assembly, such as for a vehicle suspension, is also disclosed.

The above features and advantages, and other features and advantages of the present disclosure, will be readily apparent from the following detailed description of the embodiment(s) and best mode(s) for carrying out the described disclosure when taken in connection with the accompanying drawings and appended claims.

DETAILED DESCRIPTION

Figure 1:
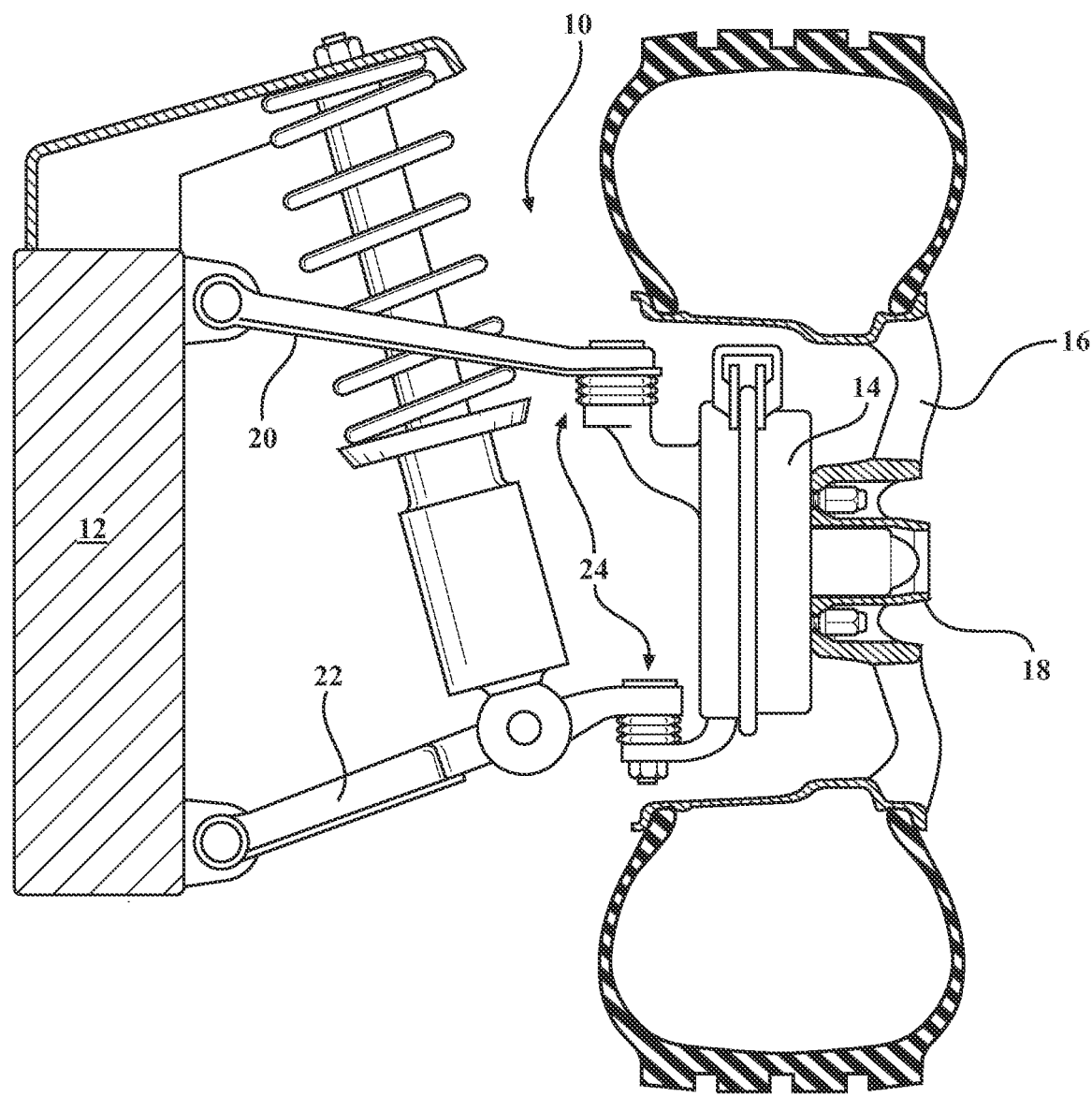
FIG. 1 is a schematic cross-sectional illustration of a representative vehicle suspension corner employing two ball joints.

Referring to the drawings, wherein like reference numbers refer to like components, FIG. 1 shows a perspective schematic view of a representative suspension corner 10 connected to a body 12 of a motor vehicle. In general, as shown, the vehicle suspension corner 10 includes a knuckle 14 configured to support a respective road wheel 16 via a wheel hub 18 with a bearing assembly (not shown). As shown in FIG. 1, the vehicle body 12 is operatively connected to the knuckle 14 via an upper control arm 20 and a lower control arm 22. Specifically, each of the upper control arm 20 and lower control arm 22 is operatively connected to the knuckle 14 via a ball joint. Such a ball joint generally employs a ball stud structure 24, such as a prior art ball stud 26 shown in FIG. 2.

Figure 2:
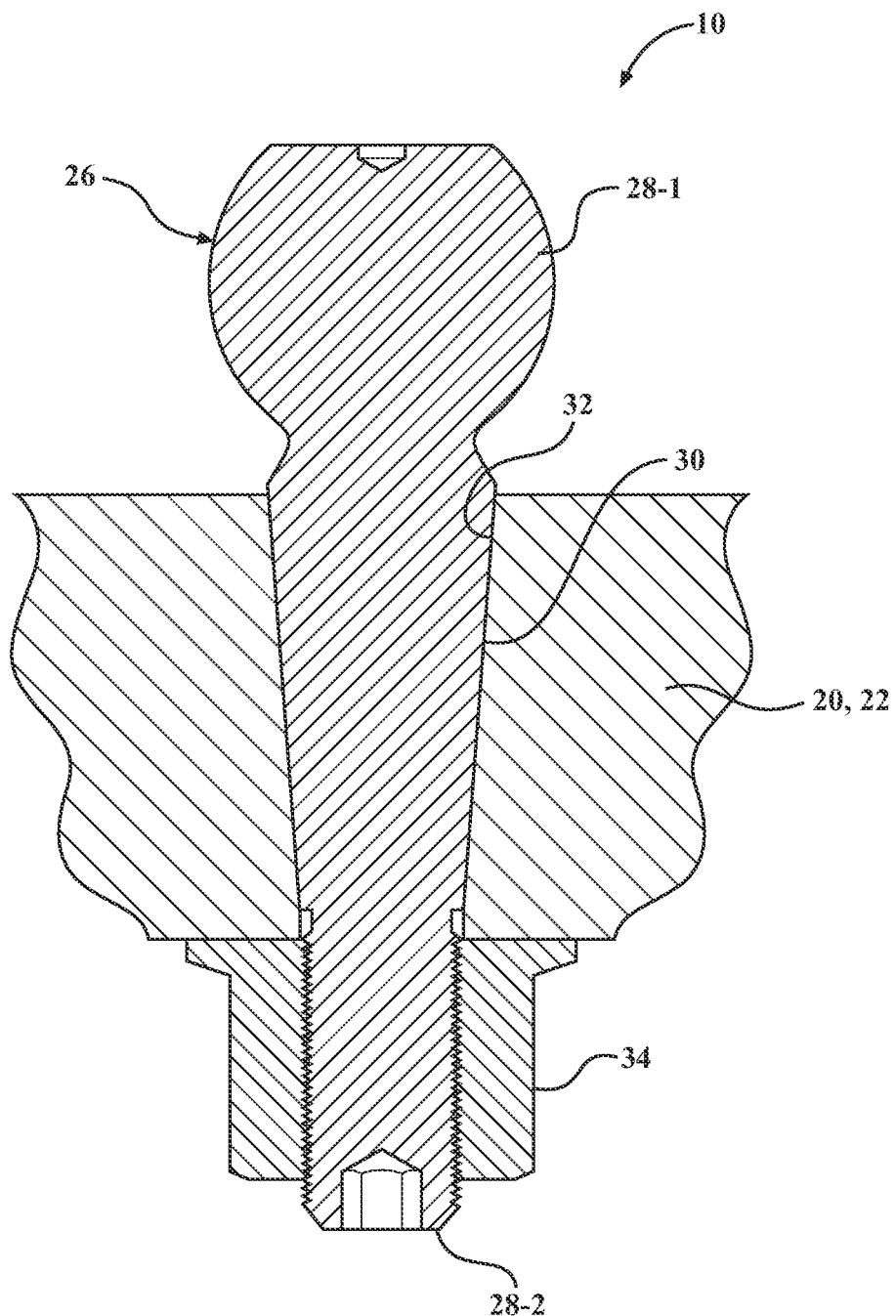
FIG. 2 is a schematic cross-sectional view of a ball stud according to prior art.

As may be seen in FIG. 2, the prior art ball stud 26 includes a ball first end 28-1 and a threaded second end 28-2. The ball stud 26 additionally includes a shank 30. The shank 30 has a tapered shape configured to fit into and extend through a similarly tapered matching aperture 32 to center the ball stud 26 within the respective upper or lower control arm 20, 22. The tapered shape of the shank 30 is configured to minimize lateral clearance between the ball stud 26 and the mating upper or lower control arm 20, 22. The particular ball stud 26 is secured on the respective mating upper or lower control arm 20, 22 via a threaded nut 34 engaged with the threaded second end 28-2. In some applications, the ball stud 26 and the mating upper and lower control arms 20, 22 are both constructed from steel. In other applications, however, a steel ball stud 26 is used with mating components constructed from a lower density and strength material, such as aluminum. In such situations, suspension forces may, over time, cause the steel shank 30 to dilate the diameter of the aperture 32 and drive the tapered shank deeper into the respective mating upper or lower control arm 20, 22. Such dilation of the aperture 32 may result in loosening of the threaded nut 34 and the ball joint 100 structure, and may, under extreme conditions, cause the subject control arm 20 or 22 to split.

Figure 3:
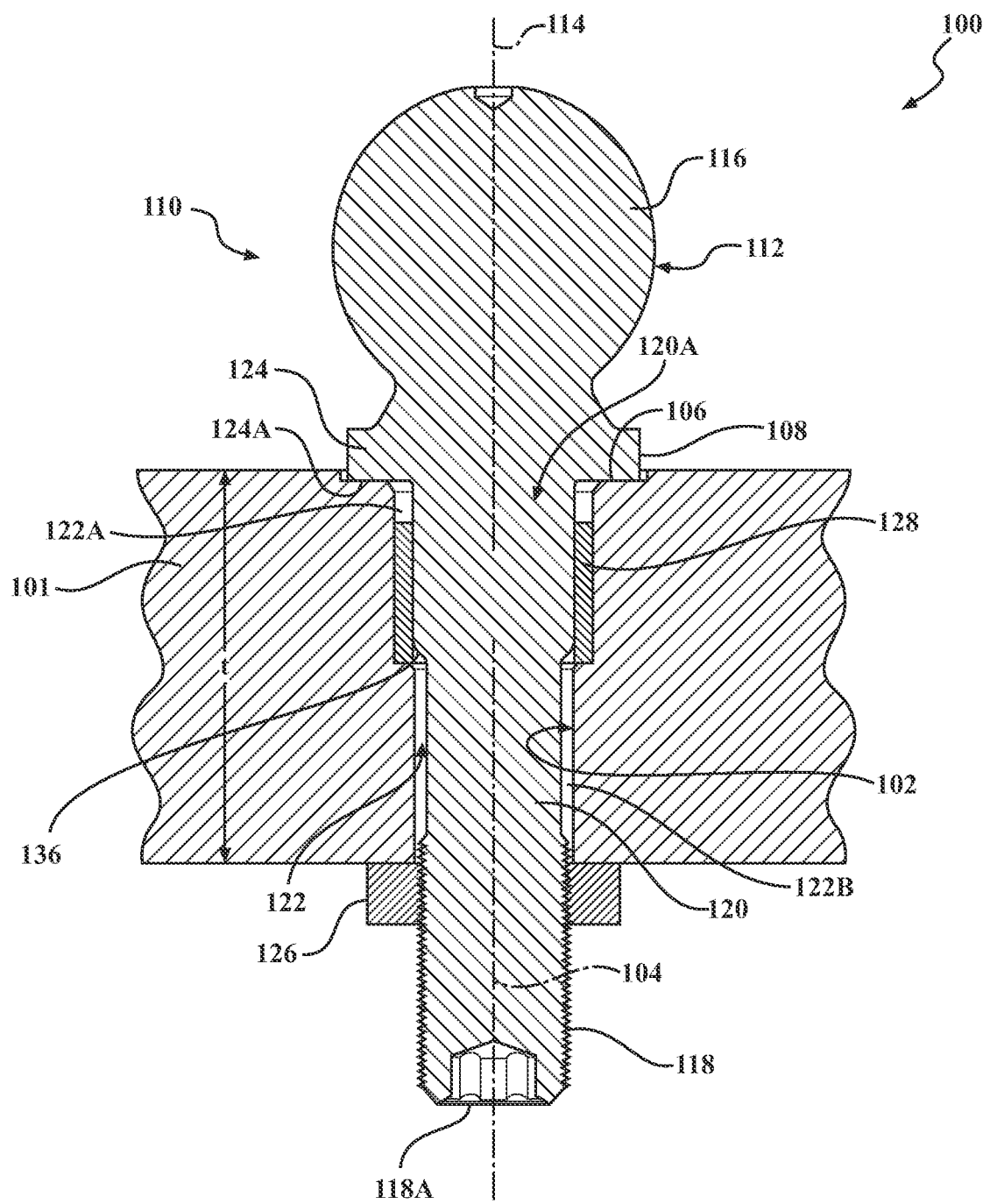
FIG. 3 is a schematic cross-sectional general view of a ball stud assembly having a deformable sleeve, shown in an installed state, according to the present disclosure.

FIG. 3 shows a ball joint subassembly 100 according to the present disclosure. The ball joint subassembly 100 may be employed in the ball stud structure 24. As shown in FIG. 3, the ball joint subassembly 100 includes a component 101, which may, for example, be either the upper control arm 20 or the lower control arm 22 shown in FIG. 1. As shown, the component 101 has a thickness t. The component 101 defines a stepped bore 102 extending through the thickness t. The stepped bore 102 is centered on and extends along a bore axis 104. The component also has a reaction surface 106 orthogonal to the bore axis 104. The reaction surface 106 may be recessed or include a step 108 in the surface contour of the component 101. According to the present disclosure, as may also be seen in FIG. 3, a mating ball stud assembly 110 is configured to engage the component 101. The ball stud assembly 110 has a ball stud 112 arranged along a stud axis 114 and includes a ball first end 116 and a threaded second end 118. The ball stud 112 also includes a shank 120 extending along the stud axis 114 between the first and second ends 116, 118. As shown, the second end 118 may include a cavity 118A configured to accept an installation or drive tool (not shown) used to hold the ball stud 112 in position while the ball joint subassembly 100 is tightened.

With continued reference to FIG. 3, the shank 120 has a stepped shank shape 120A. In general, when viewed in a cross-sectional plane along the stud axis 114, the stepped shank shape 120A transitions between a relatively smaller section and a relatively larger section, as will be described in detail below. The shank 120 is configured to extend through the stepped bore 102, such that the stud axis 114 coincides with the bore axis 104. When positioned inside the stepped bore 102, a gap 122 purposely remains between the stepped bore and the stepped shank shape 120A. The ball stud 112 also includes a flange 124 arranged between the ball first end 116 and the shank 120. The flange 124 has a flange surface 124A arranged orthogonal to the stud axis 114 and configured to engage and abut or seat against the reaction surface 106 of the component 101. The flange 124 thereby establishes longitudinal positioning of the ball stud 112, minimizes longitudinal movement of the ball stud due to service loads. The ball stud assembly 110 also includes a threaded nut 126 configured to engage the threaded second end 118 to tighten and fix the ball stud 112 relative to the component 101. By minimizing longitudinal movement of the ball stud 112, the flange 124 also resists loosening of the threaded nut 126.

Figure 4:
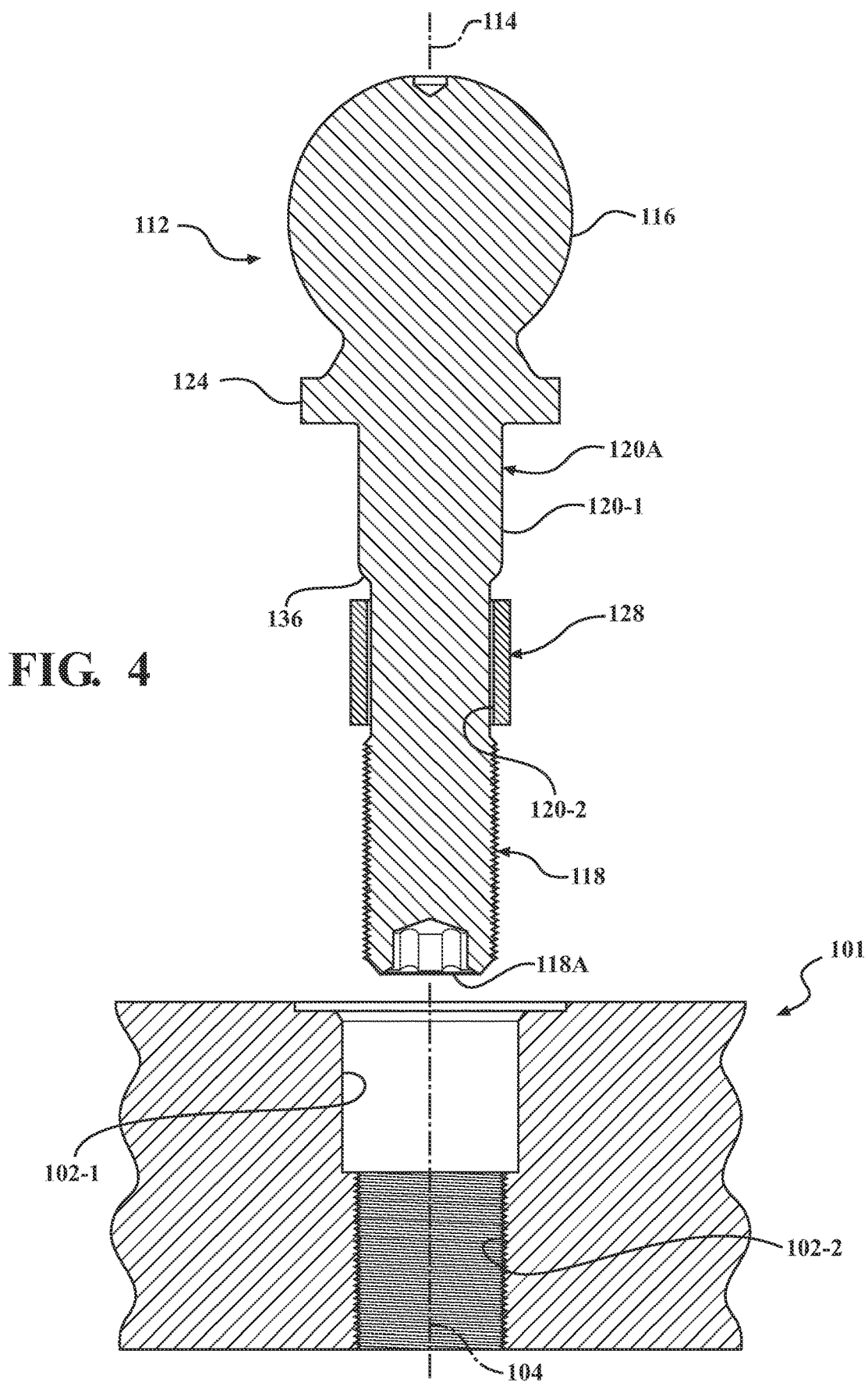
FIG. 4 is a schematic cross-sectional view of one embodiment of the ball stud assembly depicted in FIG. 2, shown prior to installation, according to the present disclosure.
Figure 5:
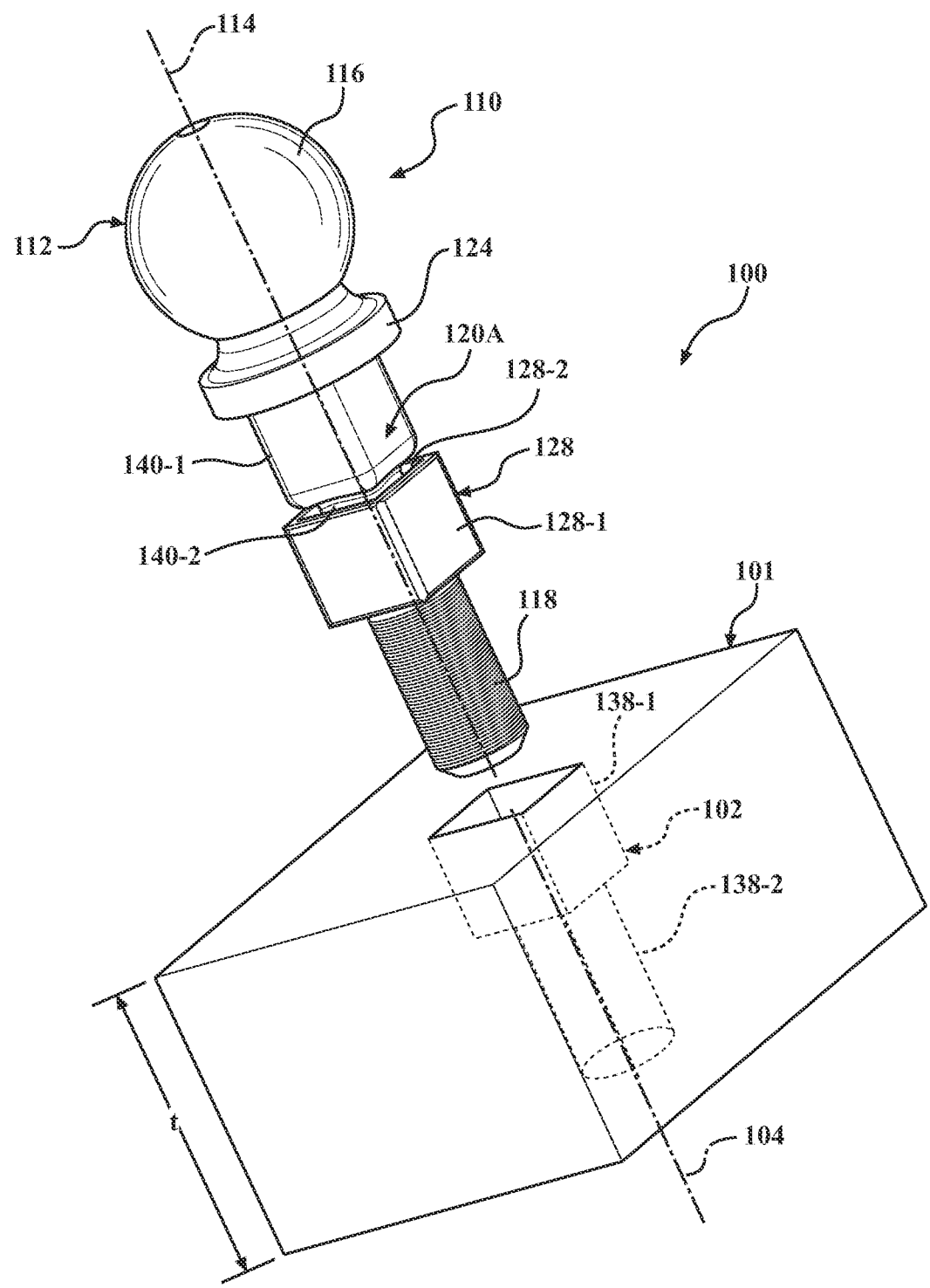
FIG. 5 is a schematic cross-sectional view of another embodiment of the ball stud assembly depicted in FIG. 2, shown prior to installation, according to the present disclosure.
Figure 6A:
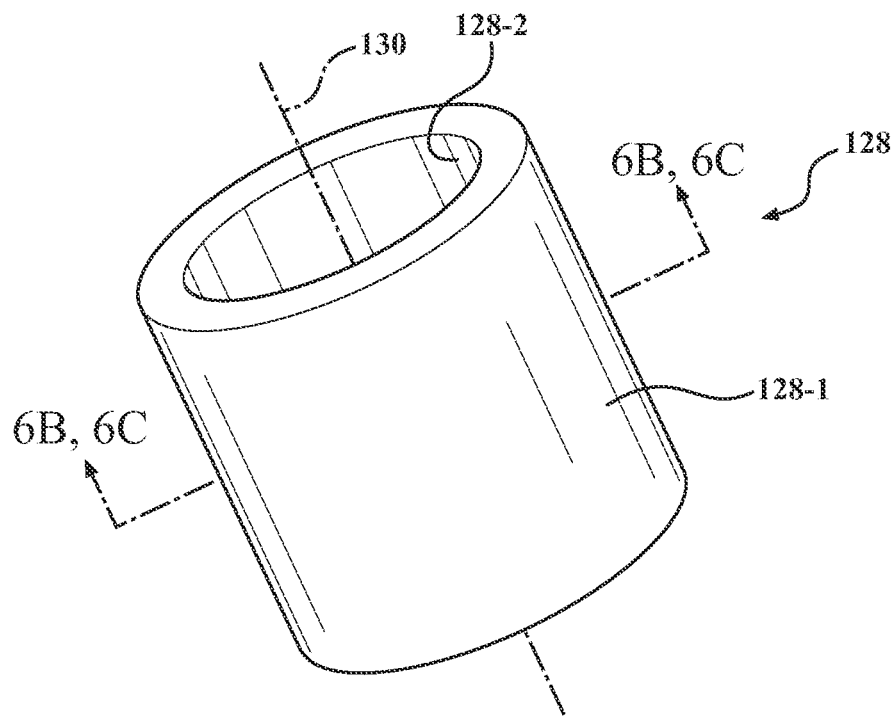
FIG. 6A is a schematic close-up perspective view of an embodiment of the sleeve shown in FIG. 4.
Figure 6B:
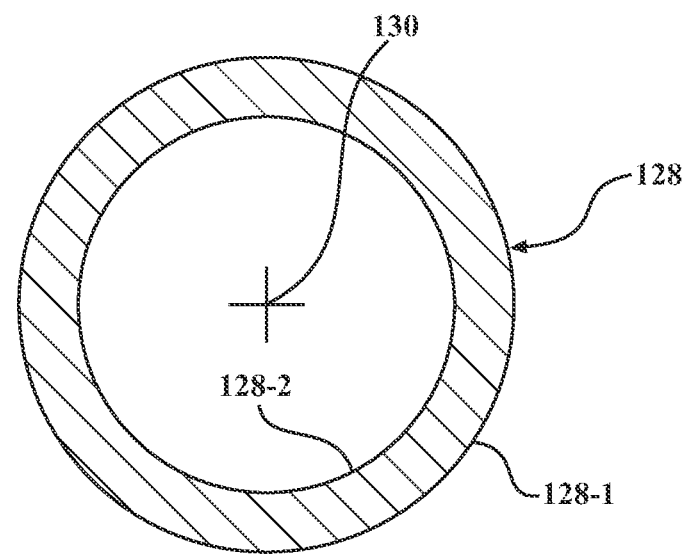
FIG. 6B is a schematic close-up cross-sectional view of an embodiment of the sleeve shown in FIG. 6A.
Figure 6C:
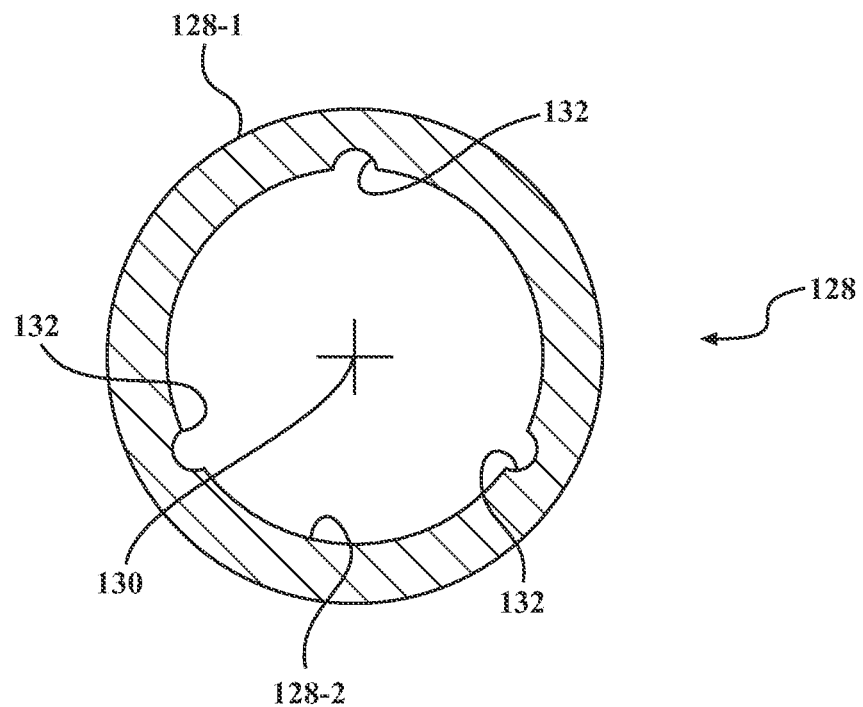
FIG. 6C is a schematic close-up cross-sectional view of another embodiment of the sleeve shown in FIG. 6A.
Figure 6D:
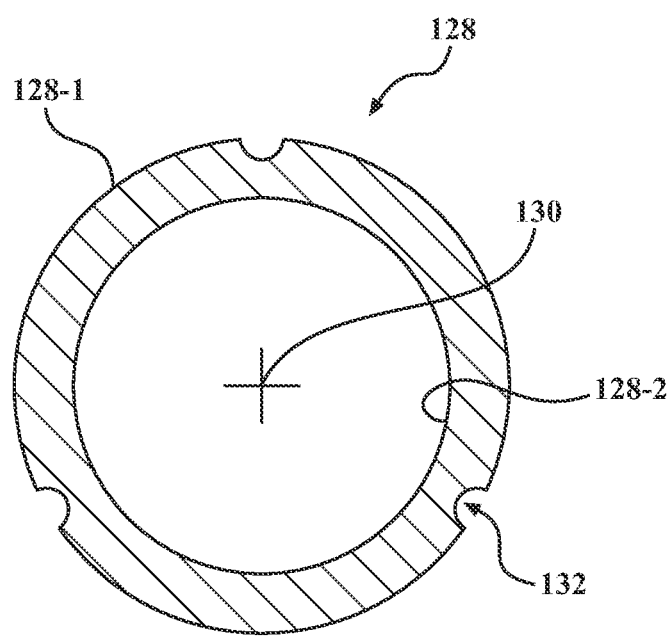
FIG. 6D is a schematic close-up cross-sectional view of one more embodiment of the sleeve shown in FIG. 6A.

As shown in FIGS. 3-5, the ball stud assembly 110 also includes a sleeve 128 having a center axis 130 and positioned on the shank 120. As shown in FIGS. 6A-6D and 7, the sleeve 128 includes an outer surface 128-1 and an inner surface 128-2. The sleeve 128 is configured, i.e., shaped and sized, to be inserted into the stepped bore 102 along with the shank 120 when the ball stud 112 is assembled with the component 101. The sleeve 128 may be generated, e.g., formed or machined, from a tough but deformable material, such as AISI 1010 Steel. As particularly shown in FIG. 6C, the sleeve 128 may additionally include one or more longitudinal grooves 132 arranged on the inner surface 128-2 and extending parallel to the sleeve center axis 130. Alternatively, the longitudinal grooves 132 may be arranged on the outer surface 128-1, as shown in FIG. 6D. Furthermore, the sleeve 128 may include such longitudinal grooves 132 on each of the outer surface 128-1 and the inner surface 128-2. The longitudinal groove(s) 132 may be employed to provide fillable space to facilitate displacement of sleeve material during the sleeve's deformation and shift within the gap 122, effectively match the volume of the gap, and thus reduce assembly forces during installation of the ball stud 112, as will be described in detail below. The ball stud 112 may include a bonding material, such as polyvinyl chloride (PVC), applied to the shank 120, specifically configured to retain the sleeve 128 thereon during handling of the ball stud assembly 110 prior to installation on the component 101.

The previously noted tightening of the nut 126 at the threaded second end 118, specifically as the drive tool engages the cavity 118A, has the effect of shifting the sleeve 128 along the stud axis 114 toward the flange 124 (from a position shown in FIG. 4 to a position shown in FIG. 3). The subject shift of the sleeve 128 is accompanied by the sleeve being deformed to fill at least part of the gap 122 between the stepped bore 102 and the stepped shape shank 120A. To reduce forces during installation of the ball stud 112 on the mating component 101, the stepped shank shape 120-1 may include a tapered transition 136 (shown in FIGS. 3 and 4) between adjacent sections thereof. As the sleeve 128 is deformed in the gap 122, the sleeve fills at least part of the gap to minimize lateral clearance between the ball stud 112 and the component 101, while accommodating machining dimensional variation. Additionally, employing the sleeve 128 between the stepped bore 102 and the stepped shape shank 120A minimizes likelihood of the joint loosening during service life of the ball joint subassembly 100, especially when the mating component uses a lower density material. Accordingly, the ball stud assembly 110 is configured to minimize, and, to the extent possible, eliminate lateral clearance between the shank 120 of the ball stud 112 and the mating component 101.

In one embodiment of the ball joint subassembly 100, the stepped bore 102 and the stepped shank 120 may each have a generally cylindrical shape (shown in FIG. 4). Specifically, the stepped bore 102 may have a stepped bore inside diameter (ID), while the stepped shank shape 120A may have a stepped shank outside diameter (OD). In such an embodiment the stepped shank OD may include a first shank section 120-1 having a first shank section OD and a second shank section 120-2 having a second shank section OD. As also shown in FIG. 4, the first shank section OD is larger than the second shank section OD. The stepped bore ID of the cylindrically shaped stepped bore 102 may include a first bore section 102-1 having a first bore section ID and a second bore section 102-2 having a second bore section ID. As also shown, the first bore section ID is larger than the second bore section OD. As shown in FIG. 3, in the ball stud 112, the first shank section OD of the mating stepped shank shape 120A may be larger than or line-on with the second bore section ID. Alternatively, as shown in FIG. 4, the first shank section OD of the mating stepped shank shape 120A in the ball stud 112 may be smaller than the second bore section ID.

The mating sleeve 128 of the embodiments shown in FIGS. 6A-6D has a sleeve OD defined by the outer surface 128-1 and a sleeve ID defined by the inner surface 128-2 (shown in FIGS. 6A-6D), thus establishing the sleeve's thickness. Before the threaded nut 126 (shown in FIG. 3) is tightened, the sleeve 128 is initially arranged on the second shank section OD. Accordingly, before the sleeve 128 is deformed by tightening of the threaded nut 126, the sleeve OD is smaller than the first bore section ID but larger than the second bore section ID. Additionally, also before the threaded nut 126 is tightened, the sleeve ID is larger than the second shank section OD but smaller than the first shank section OD. By tightening of the threaded nut 126, the sleeve 128 may be forced via the second bore section ID toward the first bore section ID. As a result, the sleeve 128 would deform by shifting, at least in part, from the second shank section OD to the first shank section OD. As may be seen in FIG. 3, the gap 122 between the stepped bore 102 and the stepped shape shank 120A may nominally include clearance or space 122A, such as between the first shank section OD and the first bore section ID. After the sleeve 128 is deformed by the tightening of the threaded nut 126, the sleeve is generally extruded through the gap 122 and becomes sandwiched, at least in part, in the space 122A between the first shank OD and the first bore ID, and the final assembly ends up with at least some clearance 122B between the second shank OD and the second bore ID.

In another embodiment, shown in FIG. 5, the stepped bore 102 is depicted as having a polygonal shape, such as, for example, a rectangular or a square (shown) shape when viewed in a plane orthogonal to the bore axis 104. The polygonal shaped stepped bore 102 may be employed to enhance lateral load carrying capacity of the ball stud 112 through increased acting surface area and additionally operate as an anti-rotation feature for the ball stud within the component 101. In such an embodiment, the stepped bore 102 includes a polygonal shaped first bore section 138-1 and a second bore section 138-2 configured to threadably engage the threaded second end 118. In the embodiment of FIG. 5, the stepped shank shape 120A may have a polygonal shaped first section 140-1, when viewed in a plane orthogonal to the stud axis 114. The polygonal shaped first section 140-1 is defined by a first shank section perimeter P1. Additionally, the stepped shank shape 120A may have a polygonal shaped second section 140-2 when viewed in a plane orthogonal to the stud axis 114. The polygonal shaped second section 140-2 is defined by a second shank section perimeter P2. In such an embodiment, the first shank section perimeter P1 is larger than the second shank section perimeter P2.

Figure 7:
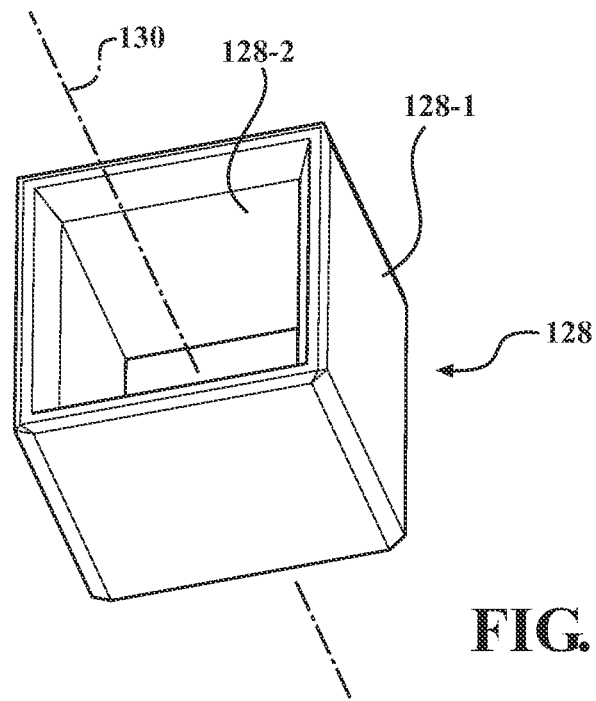
FIG. 7 is a schematic close-up perspective view of the sleeve shown in FIG. 5.

With continued reference to the embodiment of FIG. 5, and as also shown in FIG. 7, the sleeve 128 may have a polygonal shape complementary to the polygonal shaped stepped bore 102. In other words, wherein the polygonal shaped stepped bore 102 has a square shape, the sleeve 128 also has a square shape (shown in FIG. 7). Alternatively, the shapes of the sleeve 128 and the stepped bore 102 may be dissimilar and not complementary. The polygonal shaped sleeve 128 has a sleeve inner perimeter $PS_{IN}$ defined by the inner surface 128-2 and a sleeve outer perimeter $PS^{OUT}$ defined by the outer surface 128-1, thus establishing the sleeve's thickness. Before the sleeve 128 is deformed by tightening of the threaded nut 126, the sleeve inner perimeter $PS_{IN}$ is larger than the second shank section perimeter P2 but smaller than the first shank section perimeter P1. Accordingly, before the threaded nut 126 is tightened, the sleeve 128 is initially arranged on the second shank section perimeter P2.

The gap 122 between the stepped bore 102 and the stepped shape shank 120A may nominally include the space 122A (shown in FIG. 3) between the first shank section perimeter P1 and the polygonal shaped first bore section 138-2. By the tightening of the threaded nut 126, the sleeve 128 may be forced via the second bore section 138-2 toward the polygonal shaped first bore section 138-1. As a result, the sleeve 128 would deform and shift, at least in part, from the polygonal shaped second section 140-2 to the polygonal shaped first section 140-1. After the sleeve 128 is deformed by tightening of the threaded nut 126, the sleeve is generally extruded through the gap 122 and becomes sandwiched, at least in part, in the space 122A between the first shank perimeter P1 and the polygonal shaped first bore section 138-1. Furthermore, the final assembly will end up with at least some clearance 122B between the second shank perimeter P2 and the second bore section 138-2.

Overall, in either the embodiment of FIG. 4 or the embodiment of FIG. 5, the ball joint subassembly 100 employs the ball stud assembly 110 with the deformable sleeve 128 that is arranged on one section of the ball stud's stepped shank 120 before the ball stud assembly is inserted into the mating component 101. The sleeve 128 is further configured to shift to another section of the shank as the ball stud assembly 110 is tightened on the mating component 101, and thereby take up lateral clearance between the ball stud's shank and the component's stepped bore to thereby generate a robust ball joint subassembly 100. Specifically, such a construction of the ball stud assembly 110 minimizes likelihood of the joint loosening during its service life, particularly when the mating component 101 uses a lower density material.

Figure 8:
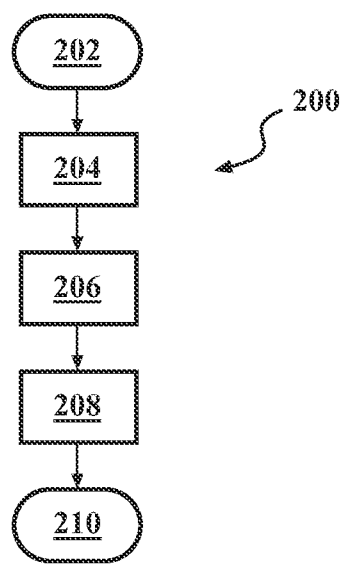
FIG. 8 is a flow diagram of a method of generating a ball joint subassembly as shown in FIGS. 1-7, according to the present disclosure.

A method 200 of generating a ball joint subassembly 100 is shown in FIG. 8 and described below with reference to the description of the component 101, such as the upper control arm 20 or the lower control arm 22, and the mating ball stud assembly 110, shown in FIGS. 1-7. Method 200 commences in frame 202 with providing or positioning the component 101, such as in a fixture (not shown). Following frame 202, the method advances to frame 204. In frame 204, the method includes engaging the component 101 with the ball stud assembly 110. Specifically, the threaded second end 118 of the ball stud assembly 110 may be aligned with the stepped bore 102 for insertion therein. After frame 204 the method proceeds to frame 206.

In frame 206, the method includes inserting the shank 120 along with the sleeve 128 into the stepped bore 102. As described above with respect to FIG. 6C, the sleeve 128 may include at least one longitudinal groove 132 arranged either on the sleeve outer surface 128-1 or on the inner surface 128-2 and extending parallel to the sleeve center axis 130. Alternatively, the sleeve 128 may include such longitudinal grooves 132 on each of the outer surface 128-1 and the inner surface 128-2. Insertion of the shank 120 permits the shank to extend through the stepped bore 102 and leave the gap 122 between the stepped bore and the stepped shank shape 120A. From frame 206, the method moves on to frame 208. In frame 208, the method includes engaging the threaded nut 126 with the threaded second end 118 and tightening thereon to tighten the ball stud 112 on the component 101. Tightening the threaded nut 126 brings the flange 124 into engagement with the reaction surface 106 such that the flange abuts the reaction surface, while the sleeve 128 is shifted from one section of the stepped shank shape 120A to another section of the stepped shank shape. As the sleeve 128 is deformed in the gap 122, the sleeve is also partially shifted from one section of the stepped shank shape 120A to another, and thereby fills at least part of the space 122A. The longitudinal groove(s) 132 may be specifically employed to facilitate reduction of assembly forces, i.e., applied torque and stresses due to deformation of the sleeve 128, during tightening of the threaded nut 126.

In the embodiment shown in FIG. 4, where the stepped bore 102, the stepped shank shape 120A, and the mating sleeve 128 each have generally cylindrical shapes, by tightening the threaded nut, the sleeve is forced via the second bore section ID toward the first bore section ID. The sleeve 128 thereby deforms by shifting, at least in part, from the second shank section OD to the first shank section OD. Alternatively, in the embodiment shown in FIG. 5, where the stepped bore 102, the stepped shank shape 120A, and the mating sleeve 128 each have a generally polygonal shape, by tightening the threaded nut 126, the sleeve 128 is deformed and at least partially forced via the second bore section 138-2 toward the polygonal shaped first bore section 138-1. Furthermore, in the embodiment of the sleeve 128 and the stepped shank shape 120A having dissimilar shapes, the tightening of the threaded nut 126 may substantially conform the sleeve shape to the space 122A between the first section 140-1 and the first bore section 138-1. The sleeve 128 thereby deforms and shifts, at least in part, from the polygonal shaped second section 140-2 to the polygonal shaped first section 140-1. Method 200 may conclude in frame 210 following frame 208, for example with verification of tightening torque of the threaded nut 126, to complete the manufacture of the ball joint subassembly 100.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment may be combined with one or a plurality of other desired characteristics from other embodiments, resulting in other embodiments not described in words or by reference to the drawings. Accordingly, such other embodiments fall within the framework of the scope of the appended claims.

What is claimed is:

1. A ball joint subassembly comprising:
    a component having a thickness, defining a stepped bore extending through the thickness, centered on and extending along a bore axis, and having a reaction surface orthogonal to the bore;
    a ball stud extending along stud axis and engaging the component, the ball stud having:
        a ball first end;
        a threaded second end;
        a shank extending along the stud axis between the first and second ends, having a stepped shank shape, and extending through the stepped bore and leaving a gap between the stepped bore and the stepped shank shape
        a flange arranged between the ball first end and the shank, having a flange surface arranged orthogonal to the stud axis, and configured to engage and abut the reaction surface; and
    a sleeve having a sleeve center axis and positioned on the shank inside the bore; and
    a threaded nut engaged with the threaded second end to tighten the ball stud on the component and deform the sleeve in the gap between the stepped bore and the stepped shape shank such that the sleeve fills at least part of the gap.

2. The ball joint subassembly according to claim 1, wherein:
    the stepped bore has a stepped bore inside diameter (ID);
    the stepped shank shape has a stepped shank outside diameter (OD);
    the stepped shank OD includes a first shank section having a first shank section OD and a second shank section having a second shank section OD; and the first shank section OD is larger than the second shank section OD.

3. The ball joint subassembly according to claim 2, wherein:
the stepped bore ID includes a first bore section having a first bore section ID and a second bore section having a second bore section ID;
the first bore section ID is larger than the second bore section OD; and
the first shank section OD is larger than the second bore section ID.

4. The ball joint subassembly according to claim 3, wherein the sleeve has a sleeve center axis, a sleeve OD, and a sleeve ID, and wherein, before the sleeve is deformed by tightening of the threaded nut:
the sleeve OD is smaller than the first bore section ID but larger than the second bore section ID;
the sleeve ID is larger than the second shank section OD but smaller than the first shank section OD;
the sleeve is positioned on the second shank section OD; and
the gap between the stepped bore and the stepped shank shape includes a space between the first shank section OD and the first bore section ID.

5. The ball joint subassembly according to claim 4, wherein, by tightening of the threaded nut, the sleeve is forced via the second bore section ID toward the first bore section ID, the sleeve deforms by shifting, at least in part, from the second shank section OD to the first shank section OD.

6. The ball joint subassembly according to claim 1, wherein:
the stepped bore has a polygonal shaped first bore section and a second bore section;
the stepped shank shape has a polygonal shaped first section defined by a first shank section perimeter and a polygonal shaped second section defined by a second shank section perimeter; and
the first shank section perimeter is larger than the second shank section perimeter.

7. The ball joint subassembly according to claim 6, wherein the sleeve has a polygonal shape defined by a sleeve inner perimeter and wherein, before the sleeve is deformed by tightening of the threaded nut:
the sleeve inner perimeter is larger than the second shank section perimeter but smaller than the first shank section perimeter;
the sleeve is arranged on the second shank section perimeter; and
the gap between the stepped bore and the stepped shank shape includes a space between the first shank section perimeter and the polygonal shaped first bore section.

8. The ball joint subassembly according to claim 6, wherein by tightening the threaded nut, the sleeve is forced via the second bore section toward the polygonal shaped first bore section, the sleeve deforms by shifting, at least in part, from the polygonal shaped second section to the polygonal shaped first section.

9. The ball joint subassembly according to claim 1, wherein the sleeve includes an outer surface, an inner surface, and at least one longitudinal groove, and wherein the at least one longitudinal groove is arranged on at least one of the sleeve inner surface and outer surface and extends parallel to the sleeve center axis.

10. A ball stud assembly configured to engage a component having a thickness, defining a stepped bore having a stepped bore inside diameter (ID) and extending through the thickness, centered on and extending along a bore axis, and having a reaction surface orthogonal to the bore axis, the ball stud assembly comprising:
a ball stud extending along a stud axis and including:
a ball first end;
a threaded second end;
a shank extending along the stud axis between the first and second ends, having a stepped shank shape, and configured to extend through the stepped bore and leave a gap between the stepped bore and the stepped shank shape, wherein:
the stepped shank shape has a stepped shank outside diameter (OD);
the stepped shank OD includes a first shank section having a first shank section OD and a second shank section having a second shank section OD; and
the first shank section OD is larger than the second shank section OD;
a flange arranged between the ball first end and the shank, having a flange surface arranged orthogonal to the stud axis, and configured to engage and abut the reaction surface; and
a sleeve having a sleeve center axis and positioned on the shank; and
a threaded nut configured to engage the threaded second end to tighten the ball stud on the component and deform the sleeve in the gap between the stepped bore and the stepped shape shank as the sleeve shifts, at least in part, from the second shank section OD to the first shank section OD such that the sleeve expands over the first shank section OD and fills at least part of the gap.

11. The ball stud assembly according to claim 10, wherein:
the stepped bore ID includes a first bore section having a first bore section ID and a second bore section having a second bore section ID;
the first bore section ID is larger than the second bore section OD; and
the first shank section OD is larger than the second bore section ID.

12. The ball stud assembly according to claim 11, wherein the sleeve has a sleeve center axis, a sleeve OD, and a sleeve ID, and wherein, before the sleeve is deformed by tightening of the threaded nut:
the sleeve OD is smaller than the first bore section ID but larger than the second bore section ID;
the sleeve ID is larger than the second shank section OD but smaller than the first shank section OD;
the sleeve is positioned on the second shank section OD; and
the gap between the stepped bore and the stepped shank shape includes a space between the first shank section OD and the first bore section ID.

13. The ball stud assembly according to claim 12, wherein, by tightening of the threaded nut, the sleeve is forced via the second bore section ID toward the first bore section ID, the sleeve deforms by shifting, at least in part, from the second shank section OD to the first shank section OD.

14. The ball stud assembly according to claim 10, wherein:
the stepped bore has a polygonal shaped first bore section and a second bore section;
the stepped shank shape has a polygonal shaped first section defined by a first shank section perimeter and a polygonal shaped second section defined by a second shank section perimeter; and the first shank section perimeter is larger than the second shank section perimeter.

15. The ball stud assembly according to claim 14, wherein the sleeve has a polygonal shape defined by a sleeve inner perimeter and wherein, before the sleeve is deformed by tightening of the threaded nut:

the sleeve inner perimeter is larger than the second shank section perimeter but smaller than the first shank section perimeter;

the sleeve is arranged on the second shank section perimeter; and the gap between the stepped bore and the stepped shank shape includes a space between the first shank section perimeter and the polygonal shaped first bore section.

16. The ball stud assembly according to claim 14, wherein by tightening the threaded nut, the sleeve is forced via the second bore section toward the polygonal shaped first bore section, the sleeve deforms by shifting, at least in part, from the polygonal shaped second section to the polygonal shaped first section.

17. The ball stud assembly according to claim 10, wherein the sleeve includes an outer surface, an inner surface, and at least one longitudinal groove, and wherein the at least one longitudinal groove is arranged on at least one of the sleeve inner surface and outer surface and extends parallel to the sleeve center axis.

18. A method of generating a ball joint subassembly comprising:

providing a component having a thickness, defining a stepped bore extending through the thickness, centered on and extending along a bore axis, and having a reaction surface orthogonal to the bore;

engaging the component with a ball stud assembly including:

a ball stud extending along a stud axis and having:
a ball first end;
a threaded second end;
a shank extending along the stud axis between the first and second ends, having a stepped shank shape;
a flange arranged between the ball first end and the shank, having a flange surface arranged orthogonal to the stud axis; and a sleeve having a sleeve center axis and positioned on the shank;

inserting the shank into the stepped bore, such that the shank extends through the stepped bore and leaves a gap between the stepped bore and the stepped shank shape; and engaging a threaded nut with the threaded second end and tightening thereon to tighten the ball stud on the component, such that the flange engages with and abuts the reaction surface and the sleeve is shifted from one section of the stepped shank shape to another section of the stepped shank shape to thereby deform the sleeve in the gap between the stepped bore and the stepped shape shank and fill at least part of the gap.

19. The method according to claim 18, wherein the sleeve includes an outer surface, an inner surface, and at least one longitudinal groove, and wherein the at least one longitudinal groove is arranged on at least one of the sleeve inner surface and outer surface and extends parallel to the sleeve center axis, further comprising reducing assembly forces during tightening of the threaded nut via the at least one longitudinal groove.

* * * * *